United States Patent
Fager et al.

Patent Number: 5,573,805
Date of Patent: Nov. 12, 1996

[54] METHOD FOR PRODUCING SHREDDED CHEESE

[75] Inventors: Orville C. Fager; Scott G. Andrews, both of Green Bay; Dennis R. Ferdon, Abrams; David J. Garnett; Matthew T. Stenzel, both of Green Bay, all of Wis.

[73] Assignee: Schreiber Foods, Inc., Green Bay, Wis.

[21] Appl. No.: 501,777

[22] Filed: Jul. 12, 1995

Related U.S. Application Data

[63] Continuation of Ser. No. 106,330, Aug. 12, 1993, abandoned.

[51] Int. Cl.$^6$ .................................................. A23C 19/00
[52] U.S. Cl. ..................... 426/515; 426/512; 426/518
[58] Field of Search ............................. 426/515, 516, 426/517, 518, 512; 425/294, 301, 307, 316, 371, 436 R; 83/345, 408, 500

[56] References Cited

U.S. PATENT DOCUMENTS

| | | | |
|---|---|---|---|
| 127,716 | 6/1872 | Tully | 83/122 |
| 414,427 | 11/1889 | Miller | 83/122 |
| 762,608 | 6/1904 | Bechtel | 83/373 |
| 786,003 | 3/1905 | Codding | 83/437 |
| 1,314,885 | 9/1919 | Marko | 83/408 |
| 2,150,192 | 3/1939 | Sander | 83/122 |
| 2,739,647 | 3/1956 | Coste | 83/408 |
| 2,978,942 | 4/1961 | Casino | 83/355 |
| 3,066,877 | 12/1962 | Sawyer | 241/191 |
| 3,084,730 | 4/1963 | Stahmer | 146/1 |
| 3,153,362 | 10/1964 | Heijnis | 83/355 |
| 3,217,988 | 11/1965 | Lightfoot et al. | 241/101 |
| 3,403,030 | 9/1968 | Pontecorvo et al. | 99/116 |
| 3,425,123 | 2/1969 | Miller et al. | 31/5 |
| 3,516,315 | 6/1970 | Suzuki | 83/408 |
| 3,769,866 | 11/1973 | Pietrucci et al. | 83/302 |
| 3,832,924 | 9/1974 | Mickler et al. | 83/167 |
| 3,887,719 | 6/1975 | Miller | 426/517 |
| 4,626,439 | 12/1986 | Meyer | 426/517 |
| 4,646,632 | 3/1987 | Rubio | 99/538 |
| 4,665,811 | 5/1987 | Meyer | 99/455 |
| 4,782,729 | 11/1988 | Mathot | 83/408 |
| 4,837,382 | 6/1989 | Ruegg et al. | 426/503 |
| 4,960,020 | 10/1990 | Reinhard | 83/34 |
| 4,988,528 | 1/1991 | Tomoda | 426/557 |

*Primary Examiner*—George Yeung
*Attorney, Agent, or Firm*—Brinks Hofer Gilson & Lione

[57] ABSTRACT

A method and apparatus for producing shredded food products, such as cheese, is disclosed. The method and apparatus permits the production of cheese shreds to be accomplished in a unified operation wherein a sheet of cheese is produced and that sheet of cheese is cut to desired dimensions directly from the casting line. An arrangement of the invention may comprise a sheet former, a casting line, and a shredding assembly, all of which function as a single unit. The shredding assembly, itself a unique arrangement, first slices the incoming sheet of cheese into ribbons, and then cuts each of these ribbons to length. The sheet of cheese may be sliced into ribbons by passing the cheese through a pair of rollers having grooves or slots machined into their surfaces, the width of the slots corresponding to the desired width of the cheese ribbons. The cheese ribbons are presented to a plurality of transversely mounted elongate blades, each of which revolves about a common axis. Each blade cuts off segments of desired lengths from the cheese ribbons.

2 Claims, 8 Drawing Sheets

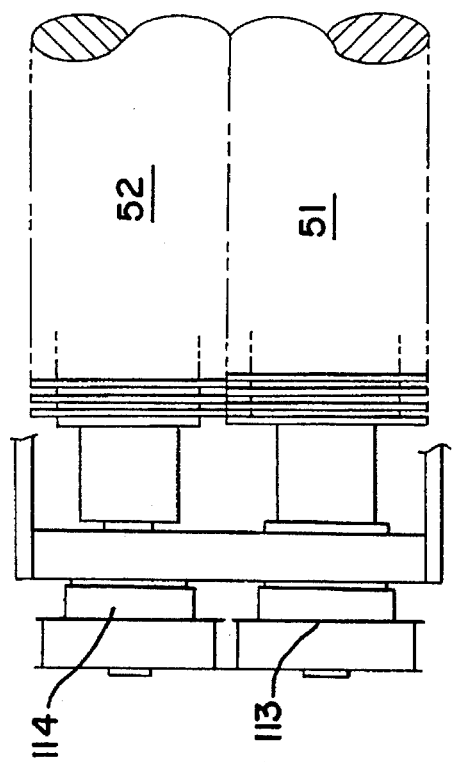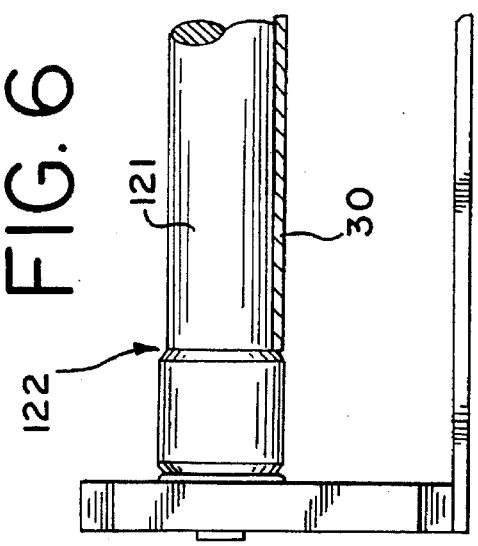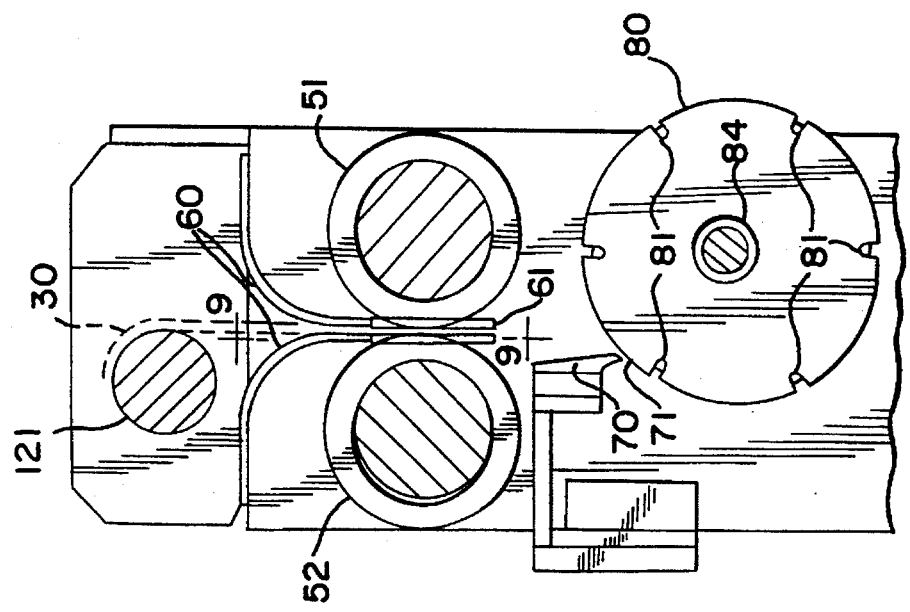

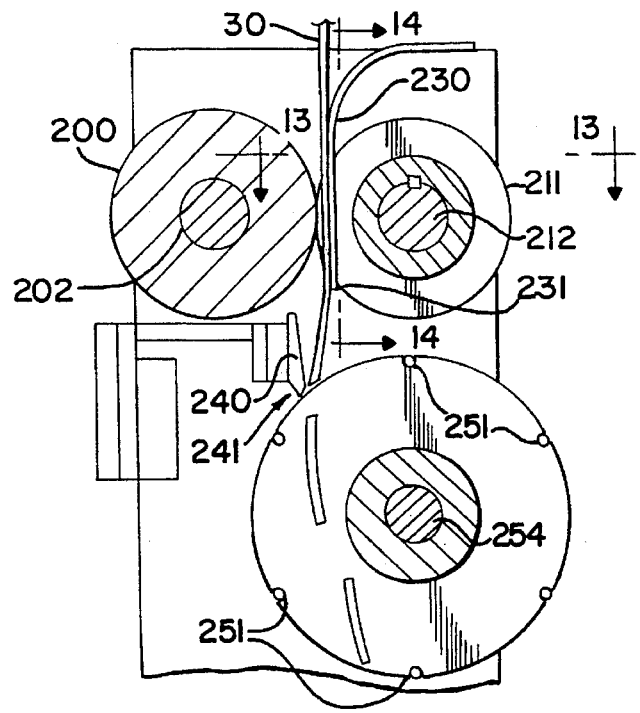
FIG. 12
FIG. 13
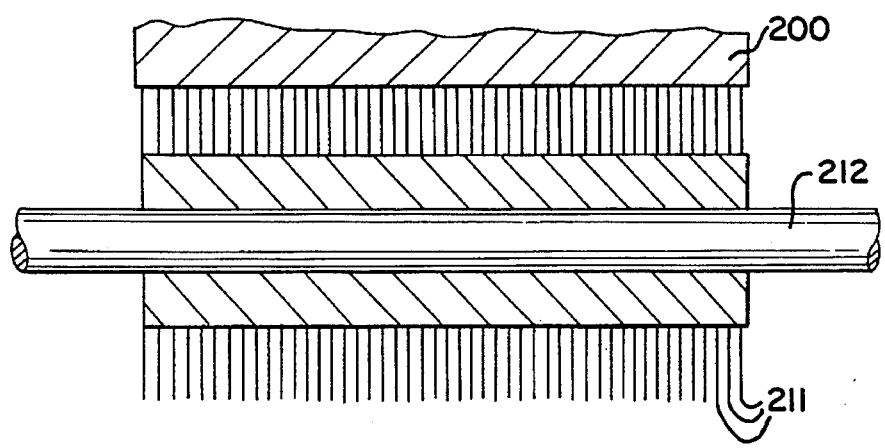
FIG. 14
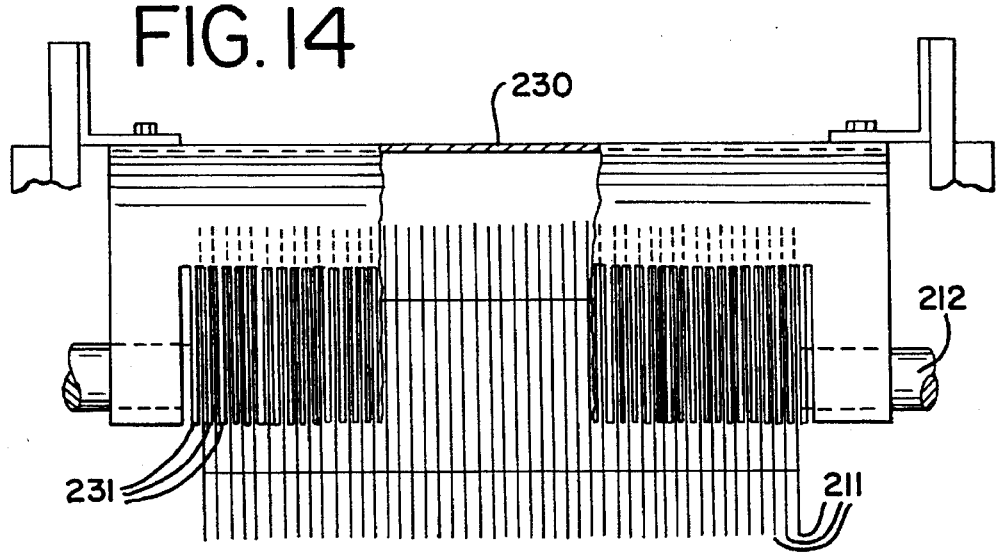

METHOD FOR PRODUCING SHREDDED CHEESE

This application is a continuation of application Ser. No. 08/106,330, filed Aug. 12, 1993, now abandoned.

BACKGROUND OF THE INVENTION

The following description of the invention is directed to the processing of a food product such as cheese to produce shreds of desired dimensions. As will be recognized by those skilled in the art, the invention is also suitable for processing other molten, moldable or plasticized food products, such as pasta. As used in the present application, the term "cheese" is intended to embrace natural cheese, processed cheese, cheese food products, imitation cheese, and the like.

Machines for producing smaller discrete portions from a larger stock of material through a series of cutting operations are well known in the art, and have been used in the production of shredded cheese. Presently, methods of producing shredded cheese involve two discrete operations. The first operation involves the manufacture of chunks of cheese. These chunks may be the by-products of another manufacturing process, such as the production of cylinders, rectangles or other shapes of cheese suitable for consumer sale. Notwithstanding the often irregular shapes of these by-products, these pieces are nonetheless a completed product.

The second operation consists of the reduction of these chunks of cheese to shreds. Food dicers such as those commercially manufactured by Urschel Laboratories are representative of the present state of the art, and are demonstrative of one prior art method and apparatus. During the first stage of this second operation, chunks of cheese are fed into a drum. Within the drum is an impeller that causes the cheese to circulate about the inner surface of the drum. A slicing knife is positioned on the inner surface of the drum so that as the chunk of cheese is forced about the inner surface of the drum it encounters the slicing knife and a slice of cheese is produced. Forcing the cheese about the inner surface of the drum in this manner also forces the slice of cheese produced to exit the drum and encounter the second and final stage of reduction.

During the second stage, the slice of cheese is fed through a feed drum and feed spindle combination to a circular knife spindle, thus cutting the slice of cheese into short ribbons. These ribbons are then cut into shorter lengths as they are driven past a cross cut knife spindle.

A second method and apparatus for shredding cheese is disclosed in U.S. Pat. No. 4,620,838 to Miller, et al. Like the Urschel method and apparatus discussed above, the Miller method and apparatus is directed to producing cheese shreds from a block of cheese formed from a number of smaller pieces or fragments, such as trim. The Miller et al. arrangement is based on the extrusion of predetermined cross sections of cheese which are cut as they emerge from openings in the extrusion apparatus.

An obvious disadvantage of each of these methods and apparatus is that each essentially involves two distinct operations, the first of which involves provision of a feed stock in a manner wholly unrelated to the second operation. A second disadvantage is that, because there is limited control over the size of the feed stock, control over the size of the cheese shreds is necessarily limited.

Therefore, it is an object of the invention to permit production of shreds of cheese or other food products in a unified operation.

It is also an object of the invention to permit more precise control over the dimensions of the shreds than that offered by present arrangements.

SUMMARY OF THE INVENTION

The present invention provides a method and apparatus for producing shredded food products, such as cheese. The invention comprises a method and apparatus which permits the production of cheese shreds to be accomplished in a unified operation wherein a sheet of cheese is produced and that sheet of cheese is cut to desired dimensions directly from the casting line.

An arrangement of the present invention comprises a sheet former, a casting line, and a shredding assembly, all of which function as a single unit. The sheet former may be a manifold that extrudes cheese in molten or liquid form so that it forms a sheet of cheese upon the casting line. In a preferred embodiment, the sheet former may comprise a fill tube which extrudes cheese in molten or liquid form into a pocket formed between two endless belts that revolve about rollers. The cheese would be further extruded by the belt and roller assembly of this sheet former to form a continuous sheet of cheese, the sheet of cheese emerging from the sheet former onto the casting line. The casting line cools the cheese and transports it to the shredding assembly. A unique and novel arrangement is provided for the shredding assembly. The shredding assembly of the present inventions first slices the incoming sheet of cheese into ribbons, and then cuts each of these ribbons to length.

In one embodiment, the sheet of cheese is sliced into ribbons by passing the cheese through a pair of rollers. These rollers have grooves or slots machined into their surfaces, and are positioned relative to one another such that the rollers intermesh. The width of the slots corresponds to the desired width of the cheese ribbons. A comb having a plurality of fingers that extend into each of the slots prevents the cheese ribbons from adhering to the rollers, ensuring that the cheese ribbons are properly removed from the rollers and are positioned for the next cut.

In another embodiment, the sheet of cheese is sliced into ribbons by passing the cheese between a roller and a rotating shaft or spindle on which is mounted a plurality of circular blades. The spindle and roller are positioned relative to one another such that the circular blades roll upon the surface of the roller. The distance between adjacent circular blades corresponds to the desired width of the ribbons of cheese produced. A comb having a plurality of fingers that extend into the spaces between adjacent circular blades prevents the cheese ribbons from adhering to the blades or spindle, ensuring that the cheese ribbons are properly removed and are positioned for the next cut.

An anvil supports the cheese ribbons as they are presented to a plurality of transversely mounted elongate blades. Each of these elongate blades revolves about a common axis. For example, the blades may be mounted about the circumference of two parallel plates, rotating about a central axis. Each blade, in cooperation with the anvil, cuts off segments of desired lengths and/or widths from the cheese ribbons. Alternatively, the blades may be wires, such as piano or harp wires. The rotational speed of the blades may be such that the cheese shreds are removed from the blades by centrifugal force.

In another embodiment, the shredding assembly comprises a rotating cutting head integrating blades that accomplish both parallel and transverse cutting of the sheet of cheese. For example, the rotating cutting head may comprise a rotating shaft mounted transversely to the direction of the incoming sheet of cheese. A plurality of spaced circular blades are mounted to the rotating shaft. A plurality of slender blades extend between and are supported by adjacent circular blades near the circumference of the circular blades. These slender blades may be wires, such as piano or harp wires. An anvil is also provided to support the incoming sheet of cheese and to cooperate with the blades of the rotating cutting head in completing the cuts.

The invention permits the production of shreds of cheese to be accomplished in a unified operation. Because the feed stock or sheet of cheese is formed with its eventual reduction in mind and because the formation and reduction of the cheese comprise parts of a unified operation, the operation provides not only substantial time savings and concomitant increased in productivity over existing methods and apparatus, but also produces cheese shreds the dimensions of which may be controlled to a degree heretofore unrealized. The shredding assembly of the invention represents itself a unique arrangement which contributes to the efficiencies of the invention.

These and other advantages of the present invention, as well as the preferred embodiment thereof, will best be understood in view of the appended drawings, a brief description of which follows.

BRIEF DESCRIPTION OF THE DRAWINGS

FIG. 4 is a cross sectional side view taken along line 4—4 of FIG. 3.

FIG. 5 is a top view of two shear rollers taken along line 5—5 of FIG. 3.

FIG. 6 is a top view of a guide roller taken along line 6—6 of FIG. 3.

FIG. 12 is a cross sectional view taken along line 12—12 of FIG. 11.

FIG. 13 is a top view taken along line 13—13 of FIG. 12.

FIG. 14 is a side view taken along line 14—14 of FIG. 12.

DETAILED DESCRIPTION OF THE DRAWINGS AND PREFERRED EMBODIMENTS OF THE INVENTION

Figure 1:
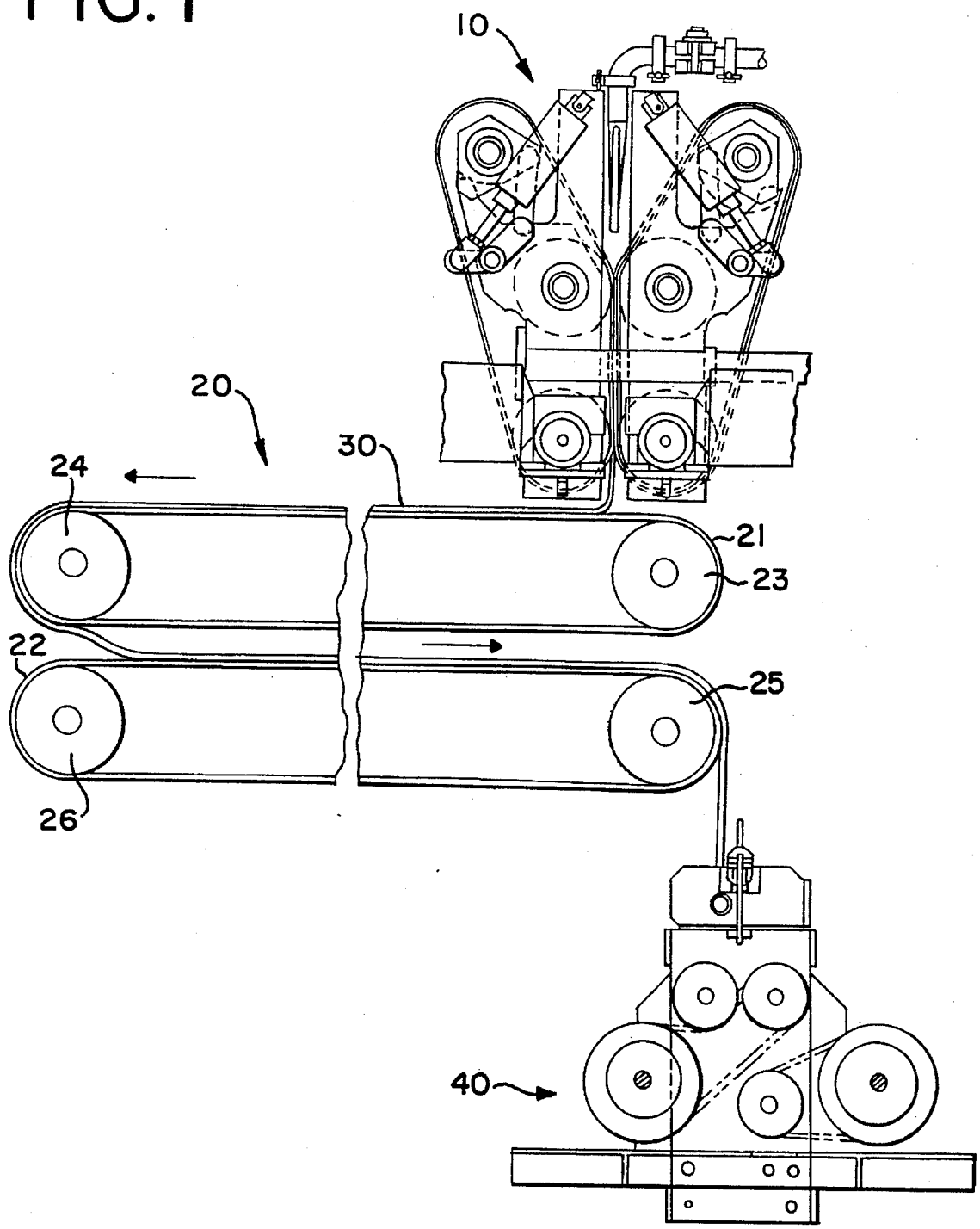
FIG. 1 is a side view showing the relative arrangement of a preferred embodiment sheet former, casting line and shredding assembly of the present invention.
Figure 3:
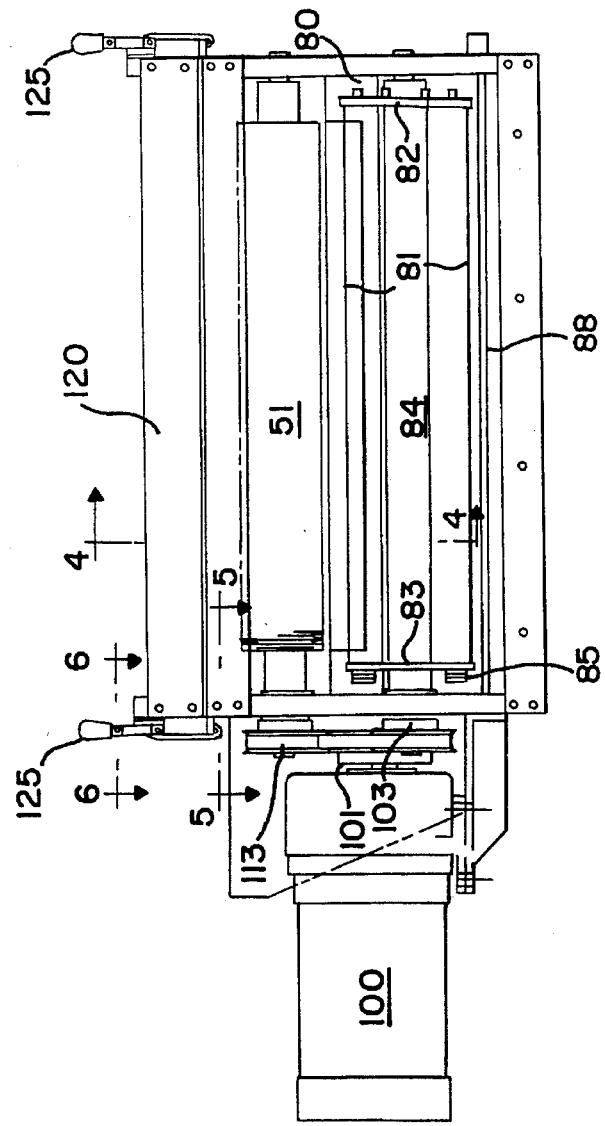
FIG. 3 is a front view of a preferred embodiment shredding assembly of FIG. 2.

FIG. 1 shows three discrete elements of one aspect of invention and their relative orientation and positioning. A sheet former 10 is positioned relative to a casting line 20 such that the continuous sheet of moldable material 30, such as cheese, produced by the sheet former 10 is deposited on the surface of a first endless belt 21 comprising a casting line 20. The sheet 30 is advanced upon the surface of the first endless belt 21, and is deposited on the surface of a second endless belt 22 advancing in an opposite direction to that of the first endless belt 21 and in a direction toward the shredding assembly 40.

The sheet former 10 may comprise conventional apparatus for forming a sheet of cheese, such as commercially available manifolds manufactured by Hart, Palmer or Johnson Cheese. Preferably, however, the sheet former 10 comprises the apparatus described in copending application Ser. No. 08/534,742, filed Sep. 27, 1995, now U.S. Pat. No. 5,527,551, which is expressly incorporated herein by reference. Cheese is provided to the sheet former in substantially liquid form. As used herein, the term "liquid" shall be understood to include any molten, moldable or fluid material.

The casting line 20 may comprise any conventional casting line, such as the commercially available Natec Chill Roll or Hart Casting Line. The structure and function of such apparatus are well known to those skilled in the art, and no attempt is made here to describe such apparatus in exhaustive detail. Briefly, the casting line shown in FIG. 1 comprises a first endless belt 21 which revolves about rollers 23 and 24, and a second endless belt 22 which revolves about rollers 25 and 26. The endless belts 21 and 22 advance in opposite directions, the second endless belt 22 advancing toward the shredding assembly 40 such that the sheet 30 is provided to the shredding assembly 40 for reduction. For example, as presently used the casting line advances the sheet at 12 feet/minute and delivers the sheet to the shredding assembly at 50° F. Other speeds and delivery temperatures are possible.

The shredding assembly 40 of FIG. 1 may comprise either of three general types of apparatus designed to reduce the continuous sheet 30 into shreds of desired dimensions, only one of which is shown in FIG. 1. Most preferably, however, the shredding assembly 40 of FIG. 1 is the apparatus shown in FIGS. 2 through 9.

Figure 2:
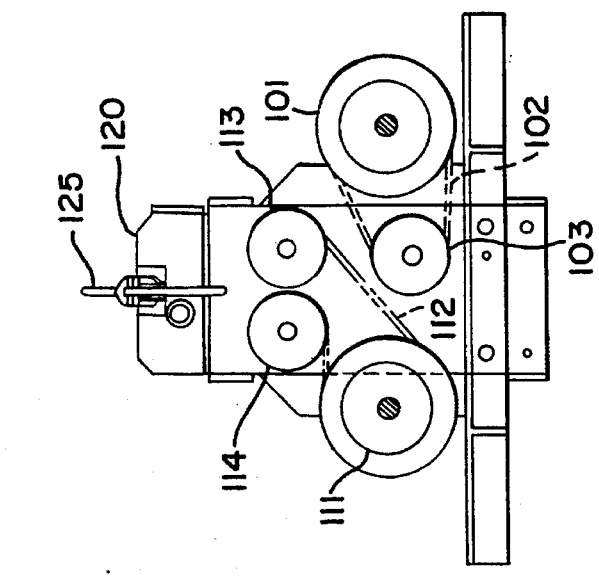
FIG. 2 is a side view of a preferred embodiment shredding assembly.

The most preferred shredding assembly comprises two intermeshing shear rollers, 51 and 52, disposed horizontally to one another as shown in FIGS. 2 and 4, and such that their longitudinal axes are transverse to the direction of the incoming sheet of cheese 30. In the preferred embodiment, both shear rollers 51 and 52 are positively driven by a motor 110 (not shown). This motor is positioned directly behind motor 100 of FIG. 3.

Figure 7:
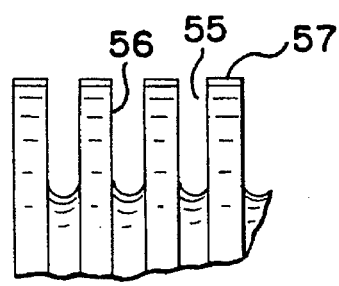
FIG. 7 is a enlarged view of the surface of the shear roller of FIG. 5.

As shown in FIG. 5 and in greater detail in FIG. 7, each shear roller 51 and 52 has machined into its surface a plurality of grooves or slots 55. The width of the slots 55 corresponds to the approximate desired width of the cheese ribbons. For example, a shear roller having an overall length of 25.38 inches and diameter of 3.02 inches includes a slotted section of 18.750 inches. A shear roller of such dimensions and further having slots of width 0.065 (±0.001) inches, depth of 0.219 (±0.001) inches and spaced 0.060 (±0.001) inches apart has been used to produce shreds having a width of approximately 0.062 inches. The walls or sides 56 of the slots 55 are substantially perpendicular to the longitudinal axis of the shear roller 51 or 52 and the base of each of the slots 55 has a slight radius. For example, for the shear roller geometry described above, this radius is 0.032 inches. Adjacent slots 55 define a projecting portion 57. The width of each projecting portion 57 is slightly less than the width of each of the slots 55; as above, 0.060 inches versus 0.065 inches. These projecting portions 57 may be considered discs; however, to facilitate cleaning and to meet health and safety requirements, the exposed surfaces of the shear rollers are preferably continuous, providing no crevices in which food or bacteria may elude cleaning operations. Further to this end, and also for efficiency of operation, the shear roller is manufactured from 316 stainless steel. Still further, the shear roller may be treated with a non-stick coating such as nickel or teflon, or may be electro-polished.

Figure 8:
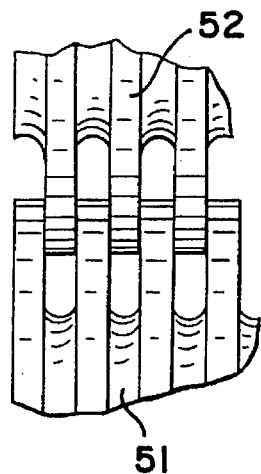
FIG. 8 is an enlarged view showing the relationship of the surfaces of two shear rollers.

As shown in FIGS. 4 and 5, and most clearly in FIG. 8, shear rollers 51 and 52 are positioned relative to one another such that the rollers intermesh. The sheet of cheese 30 passes downwardly between the two shear rollers 51 and 52 as shown in FIG. 4. The two shear rollers 51 and 52 rotate counter to one another as shown in FIG. 4, and at a speed substantially the same as, or slightly greater than, the linear velocity of the incoming sheet of cheese 30. Presently, velocities of up to 25 feet per minute have been attained, and it is projected that velocities of about 75 feet per minute may be attainable. The scissors action of the rotating intermeshing discs 57 slices the sheet of cheese into ribbons. For a sheet velocity of 12 feet per minute, a suitable rotational speed for the particular shear rollers described above is 23 rpm.

Preferably, the shredding assembly is complemented by a sheet guide roller assembly 120 which is mountable to the uppermost portion of the shredding assembly. The sheet guide roller assembly 120 comprises a sheet guide roller 121 which is disposed such that its longitudinal axis is parallel to the longitudinal axes of the shear rollers 51 and 52. The sheet guide roller 121 is further disposed such that the sheet 30 which advances about it is properly presented to the shear rollers 51 and 52 for cutting. The sheet guide roller 121 includes a bevel 122 in its surface which urges the sheet into proper position upon the roller surface. The sheet guide roller assembly 120 further includes clamps 125 which permit the assembly 120 to positively engage the shredding assembly, and yet be easily removed. Removal of the assembly 120 provides access to the shear rollers 51 and 52 for maintenance.

Figure 9:
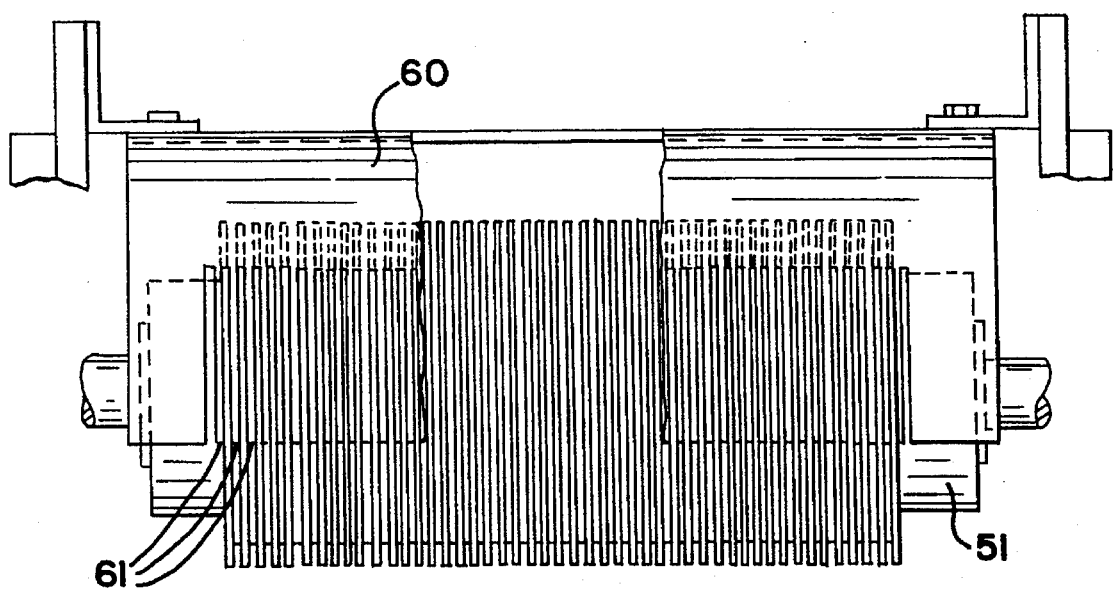
FIG. 9 is a cross sectional view taken along line 9—9 of FIG. 4.
Figure 11:
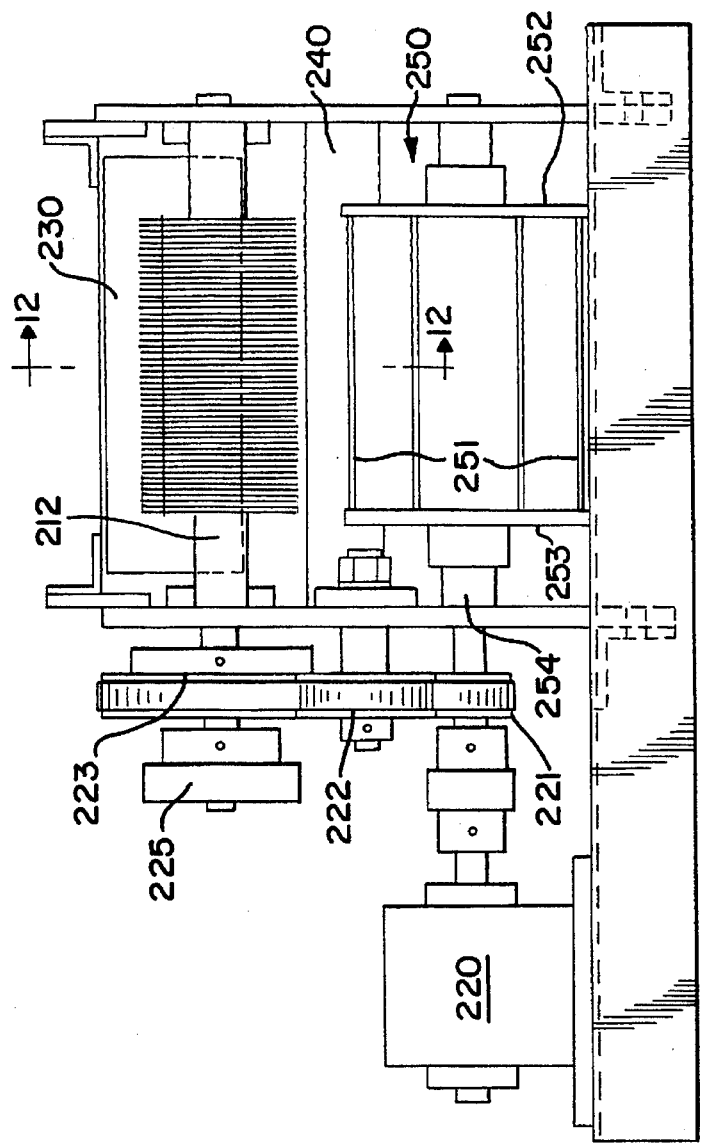
FIG. 11 is a front view of the alternative embodiment shredding assembly of FIG. 10.
Figure 10:
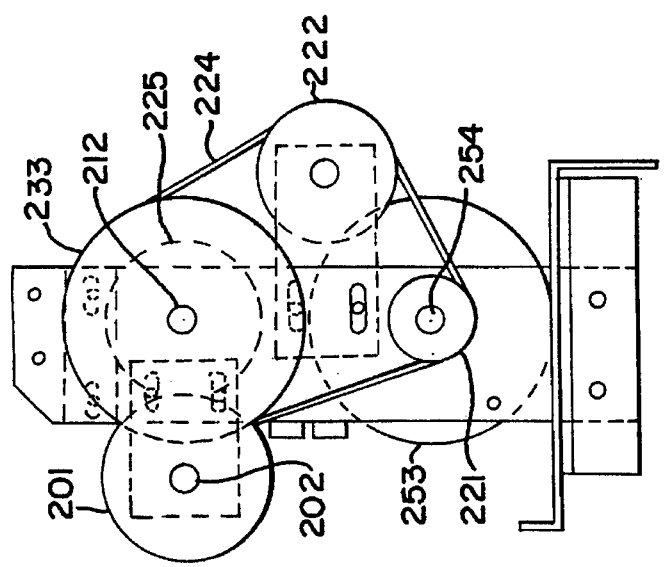
FIG. 10 is a side view of an alternative embodiment shredding assembly.

The shredding assembly further comprises a comb assembly 60 having a plurality of fingers 61 that extend into each of the slots 55 and that prevent the cheese ribbons from adhering to the shear rollers 51 and 52, ensuring that the cheese ribbons are properly removed from the shear rollers 51 and 52 and are positioned for the next cut. As shown in FIG. 4, the preferred embodiment of the invention actually uses two combs 60, each comb having a plurality of fingers 61 corresponding to the slots 55 of the shear roller 51 or 52 positioned directly beneath it. FIG. 9 shows this correspondence for one comb/roller pair. As shown in FIG. 4, the fingers 61 extend into the slots 55 and, preferably, extend to the outermost circumference of the shear rollers 51 and 52. Where the width of the slots is 0.065 inches, the width of the fingers 61 of the corresponding comb is 0.058 inches. Preferably, each comb 60 is constructed of a single piece of 316 stainless steel. Each comb may also be treated with a non-stick coating such as nickel or Teflon, or may be electro-polished. The comb may also be formed of a plastic or other non-metallic material.

The ribbons of cheese produced by the intermeshing rollers 51 and 52 exit the rollers, aided by the comb 60, downwardly toward a cross cut assembly 80. An anvil 70 supports the cheese ribbons as they are presented to the cross cut assembly 80. The anvil 70 includes a shearing edge 71 positioned to cooperate with the elongate or slender blades 81 of the cross cut assembly 80. The anvil 70 has a length of 21 inches, and may have a slight radius, bowing out slightly along its length at a radius of 125.5 inches. The anvil may be manufactured from any suitable material. The material presently being used is Ertalyte, a product of Polymer Corporation.

In the most preferred embodiment, the cross cut assembly 80 comprises two substantially parallel blade supports or parallel plates 82 and 83 mounted to a rotating shaft 84. The elongate blades 81 extend between the circular boundary plates 82 and 83 near the circumference of the plates 82 and 83. Most preferably, the elongate blades 81 comprise wires, such as piano or harp wires. These wires are commercially available from suppliers such as McMaster-Carr Supply Company, and may be formed for use in the invention. Where the elongate blades comprise wires, tensioners 85 are provided on plate 83 with which the tension in the wires 81 may be adjusted.

The rotational speed of the cross cut assembly 80 is such that wires 81 comprising the cross cut assembly 80 approach the anvil 70 in such frequency that the ribbons are cut to a desired length. The rotational speed of the cross cut assembly 80 may be adjusted so as to obtain shreds of different lengths, a relatively faster rotational speed resulting in shreds of shorter length, for instance. For example, for a sheet linear velocity of 12 feet per minute and shear roller rotational speed of 23 rpm, a cross cut assembly rotating at 23 rpm produces shreds of 1.25 inches. Most shreds are thrown from the wires 81 of the cross cut assembly 80 as the wire 81 passes the anvil 70 due to recoil of wire 81 owing to contact with the anvil 70. Preferably, however, the cross cut assembly 80 is complemented by a stripper bar 88 which aids in the removal of the cheese shreds. The stripper bar 88 extends the length of the cross-cut assembly 80 and is positioned such that cheese shreds which adhere to the wires 81 strike the bar 88 and are removed from the wires 81.

The shredding assembly is preferably driven by two motors 100 and 110. However, both the shear cut assembly and the cross cut assembly may be driven by a single motor. Motors 100 and 110 may be chosen from commercially available units, such as the Maxi-Torq Model No. 4Z386 available from Dayton Electric Company. Motor 100 is dedicated to driving the cross-cut assembly 80. Gearbelt 102 revolves about gearbelt pulleys 101 and 103. The motor 100 drives gearbelt pulley 101, with rotation of pulley 101 causing advancement of the belt 102 and rotation of pulley 103. Pulley 103 is mounted to the rotating shaft 84 of the cross cut assembly 80. Because motor 100 is dedicated to driving the cross cut assembly 80, the speed of the motor 100 may be adjusted without reference to the speed of the motor 110 (not shown) which drives the shear rollers 51 and 52. Thus, the desired length of the cheese shred may be obtained by simply adjusting the speed of the motor 100.

Motor 110 (not shown) is dedicated to driving the shear cut assembly. Double gearbelt 112 revolves about gearbelt pulleys 111, 113 and 114. The motor 110 (not shown) drives gearbelt pulley 111, with rotation of pulley 111 causing advancement of the belt 112 and rotation of pulleys 113 and 114. Pulleys 113 and 114 are connected to shear rollers 51 and 52, respectively. Alternatively, a single shear roller may be positively driven by the motor 110 (not shown). For example, the gearbelt 112 may revolve about and drive a single pulley which is connected to a shear roller, either pulley 113 or 114, the other shear roller or idler shear roller being caused to rotate by the rotation of the driven shear roller and the advancement of the sheet 30.

FIGS. 10 through 14 show an alternative embodiment of the shredding assembly. According to this aspect of the invention, the incoming sheet of cheese 30 may be sliced into ribbons by passing the cheese between a roller 200 and a rotating shaft or spindle 212 on which is mounted a plurality of circular blades 211.

As shown in FIGS. 12 and 13, the spindle 212 and roller 200 are positioned relative to one another such that the circular blades 211 roll upon the surface of the roller 200. The distance between adjacent circular blades 211 corresponds to the desired width of the ribbons of cheese to be produced. The circular blades 211 rotate at a speed equal to or slightly faster than the linear velocity of the incoming sheet of cheese 30.

As shown in FIGS. 12 and 14, a comb 230 having a plurality of fingers 231 that extend into the spaces between adjacent circular blades 211 prevents the cheese ribbons from adhering to the circular blades 211 or spindle 212, ensuring that the cheese ribbons are properly removed and are positioned for the next cut. Preferably, adjacent fingers 231 of the comb 230 are angled with respect to one another such that adjacent ribbons of cheese produced by the circular blades 211 emerge downstream of the circular blades 211 at different angles, ensuring that adjacent ribbons do not coalesce after slicing.

An anvil 240 supports the cheese ribbons as they are presented to the cross cut assembly 250. The anvil 240 includes a shearing edge 241 positioned to cooperate with the elongate or slender blades 251 of the cross cut assembly 250. In the most preferred embodiment, the cross cut assembly 250 comprises two substantially parallel blade supports or parallel plates 252 and 253 mounted to a rotating shaft 254. The elongate blades 251 extend between the circular boundary plates 252 and 253 near the circumference of the boundary plates 252 and 253. Most preferably, the elongate blades 251 comprise wires, such as piano or harp wires.

The rotational speed of the cross cut assembly 250 is such that wires 251 comprising the cross cut assembly 250 approach the anvil 240 in such frequency that the ribbons are cut to a desired length. The rotational speed of the cross cut assembly 250 may be adjusted so as to obtain shreds of different lengths, a relatively faster rotational speed resulting in shreds of shorter length, for instance. Most shreds are thrown from the wires 251 of the cross cut assembly 250 as the wire 251 passes the anvil 240 due to recoil of wire 251 owing to contact with the anvil 240. However, the cross cut assembly 250 may be complemented by incorporating a stripper bar, to aid in the removal of the cheese shreds, similar to that used in the preferred embodiment.

The shredding assembly is driven by a motor 220 which is operatively connected to the assembly. A gearbelt 224 revolves about gearbelt pulleys 221, 222 and 223. The motor 120 causes pulley 221 to rotate. Pulley 221 is connected to shaft 254, and thus rotation of pulley 221 causes the shaft 254 to rotate and the elongate blades 251 to revolve about the longitudinal axis of the shaft 254. Rotation of pulley 221 causes the gearbelt 224 to revolve about pulleys 222 and 223. Pulley 223 is connected to shaft 212, and thus rotation of pulley 223 causes the shaft 212 and the circular blades 211 to rotate. A gear 225 is mounted to the shaft 212. Another gear 201 is mounted to the shaft 202. Gears 225 and 201 are further positioned relative to each other such that rotation of gear 225 causes gear 201 to rotate and, consequently, causes roller 200 to rotate.

FIGS. 15 through 18 show an alternative embodiment of the shredding assembly, which is again functionally interchangeable with the shredding assembly of FIGS. 2 through 9. According to this aspect of the invention, the shredding assembly may comprise a rotating cutting head 310 integrating blades that accomplish both parallel and transverse cutting of the sheet of cheese.

Figure 15:
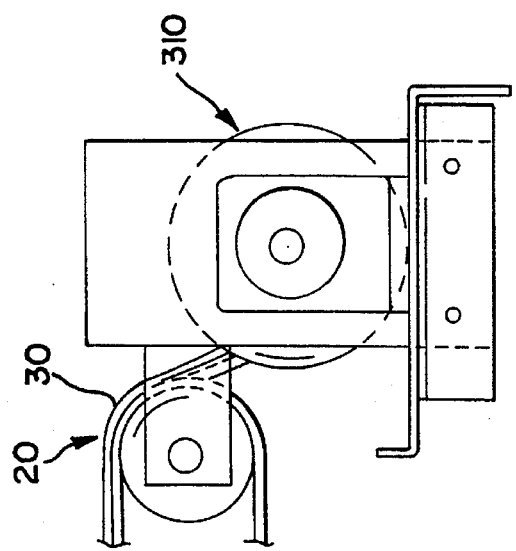
FIG. 15 is a side view of an alternative embodiment shredding assembly.
Figure 17:
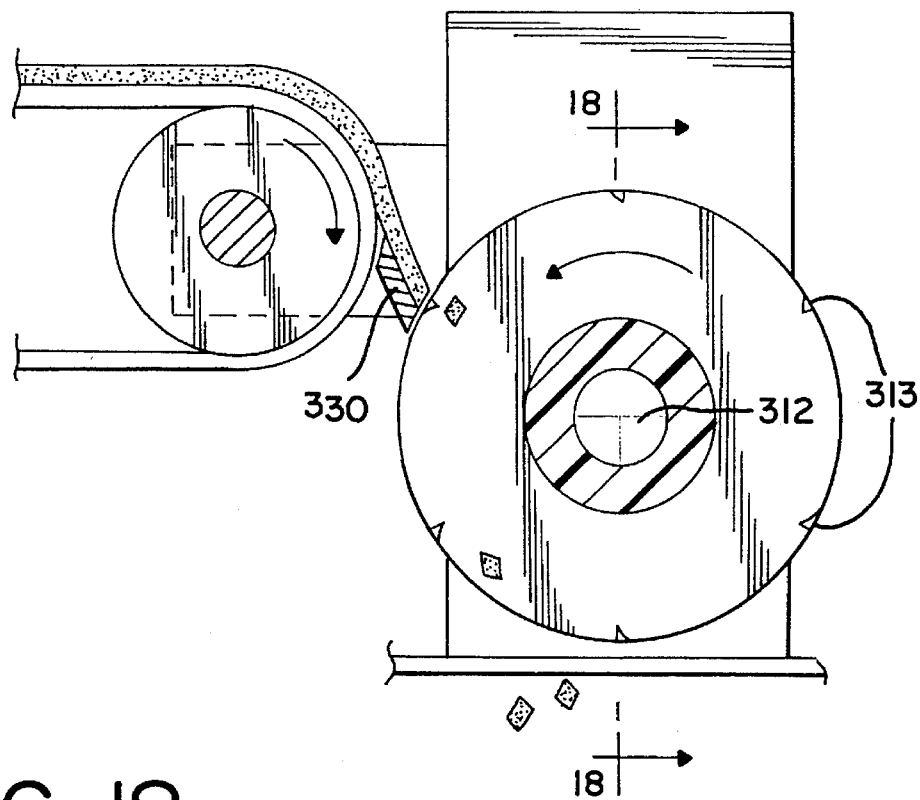
FIG. 17 is a cross sectional side view of a shredding assembly.

FIGS. 15 and 17 show the positioning of the shredding assembly relative to the incoming sheet of cheese 30 as it is advanced upon a casting line 20 for subsequent reduction. The casting line 20 is as described above.

Figure 16:
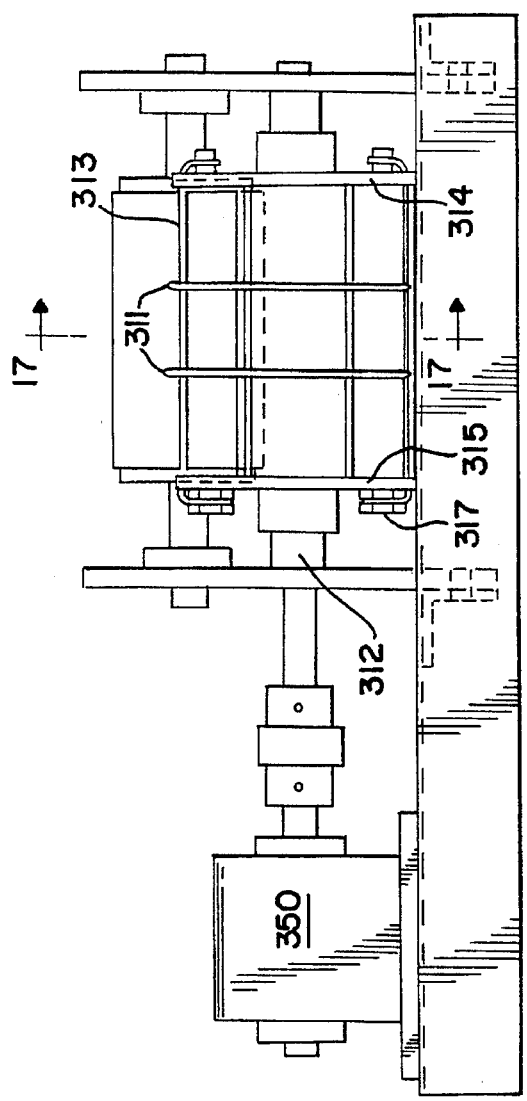
FIG. 16 is a front view of the alternative embodiment shredding assembly of FIG. 15.
Figure 18:
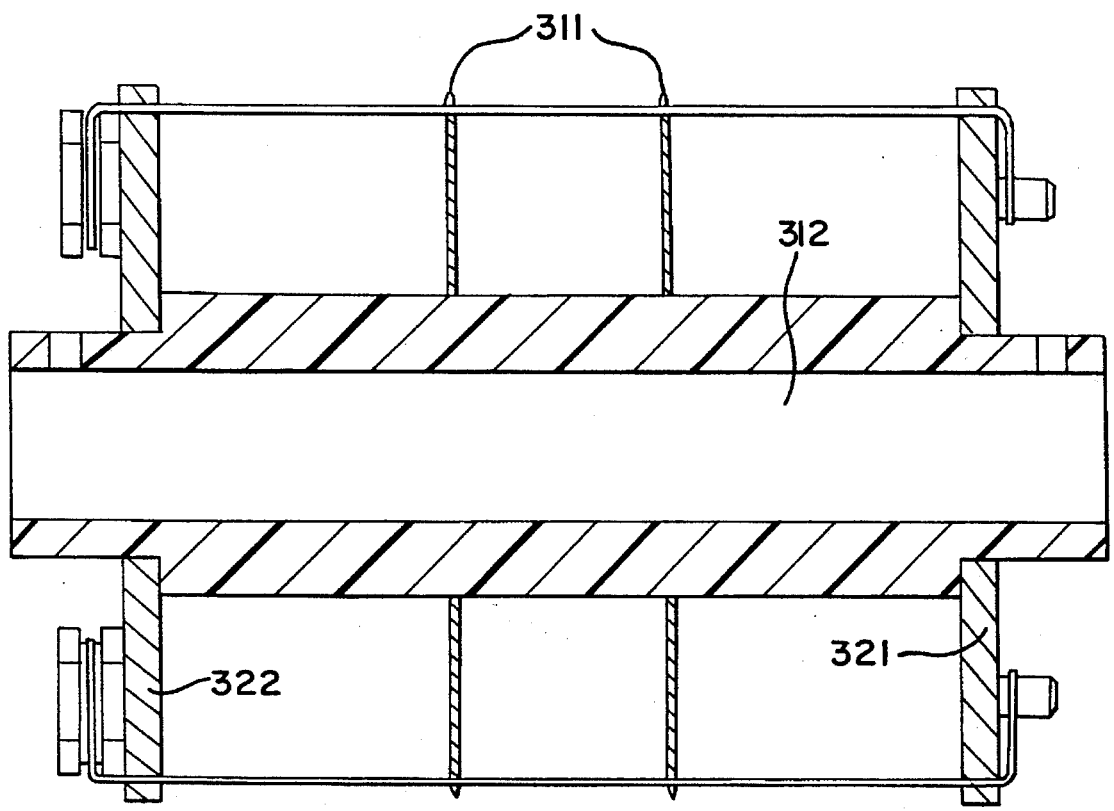
FIG. 18 is a cross sectional view taken along line 18—18 of FIG. 17.

As shown in FIGS. 16 and 18, the shredding assembly comprises a rotating cutting head 310 comprising a plurality of circular blades 311 which are mounted to a rotating shaft 312. A plurality of elongate or slender blades 313 extend between substantially parallel plates 314 and 315 near the circumference of the plates 314 and 315. Preferably, the plurality of slender blades 313 comprise wires, such as piano or harp wires. Where the elongate blades comprise wires, tensioners 317 are provided on plate 315 with which the tension in the wires 313 may be adjusted.

As shown in FIG. 17, an anvil 330 supports the incoming sheet of cheese 30 as it is presented to the rotating cutting head 310. The anvil 330 is configured and positioned to cooperate with both the elongate or slender blades 313 and the circular blades 311 of the rotating cutting head 310. The cutting head 310 rotates at a speed such that the linear distance travelled by the sheet of cheese 30 between successive cuts corresponds to the desired shred width. Both parallel and perpendicular cuts are accomplished in a substantially simultaneous fashion.

The shredding assembly is driven by a motor 350 which is operatively connected to the assembly, as shown in FIG. 16. The motor 350 is connected to shaft 312, causing rotation of the shaft 312 and, consequently, rotation of the cutting head 310.

It must be appreciated that the apparatus of the present invention is capable of being incorporated in the form of a variety of embodiments, only some of which have been fully illustrated and described above. The invention may be embodied in other forms without departing from its spirit or essential characteristics. The described embodiments are to be considered in all respects only as illustrative and are not restrictive, and the scope of the invention is, therefore, described by the appended claims rather than by the foregoing description. All changes which come within the meaning and range of equivalency of the claims are to be embraced within their scope.

We claim:

1. A method for producing cheese shreds of predetermined dimensions in a unified operation comprising the following steps in the order of:

forming a continuous sheet of cheese of substantially uniform thickness by extruding cheese in substantially liquid form;

advancing the continuous sheet of cheese relative to a shearing element;

shearing the advancing continuous sheet of cheese into continuous shreds of substantially uniform width using the shearing element, the shearing element having a plurality of cutting edges, the distance between cutting edges defining the width of said shreds of cheese;

removing the continuous shreds of cheese from between the cutting edges by providing a plurality of projections extending between the cutting edges; and cutting the advancing continuous shreds of cheese into shreds of substantially uniform length.

2. A method for producing cheese shreds of predetermined dimensions comprising the steps of:

providing a sheet former comprising at least one outlet that extrudes cheese in substantially liquid form upon an outer surface of at least one moving surface such that the extruded cheese forms a substantially continuous sheet of cheese; a casting line positioned downstream of the sheet former and comprising at least one endless belt that transports the sheet of cheese on an outer surface of the belt; a shear cut assembly positioned downstream of the casting line and comprising a plurality of rotating spaced cutting edges disposed along a common longitudinal axis and further comprising a motor that causes the spaced cutting edges to rotate about their common longitudinal axis; a comb assembly comprising a plurality of fingers extending between said cutting edges to remove continuous shreds of cheese from between said cutting edges; and a cross cut assembly comprising a plurality of elongate blades disposed transversely to the cutting edges, each of the elongate blades disposed substantially parallel to a common axis of rotation and at a common distance from the axis of rotation, and further comprising a motor that causes the elongate blades to revolve about the axis of rotation;

providing cheese in substantially liquid form to the sheet former to form a continuous sheet of cheese of substantially uniform thickness;

advancing the continuous sheet of cheese upon the casting line;

passing the continuous sheet of cheese through the shear cut assembly to slice the continuous sheet of cheese into continuous shreds of substantially uniform width;

removing the continuous shreds of cheese from between the cutting edges with the comb assembly; and passing the continuous shreds of cheese through the cross cut assembly to cut the continuous shreds of cheese into shreds of substantially uniform length.

* * * * *